United States Patent Office 3,082,257
Patented Mar. 19, 1963

3,082,257
PREPARATION OF PENTAERYTHRITOL POLYGLYCOLS
Joseph V. Karabinos and Ronald B. Colaric, Joliet, Ill., assignors to Olin Mathieson Chemical Corporation, East Alton, Ill., a corporation of Virginia
No Drawing. Filed June 1, 1960, Ser. No. 33,083
3 Claims. (Cl. 260—615)

This invention relates to polyglycols and particularly to a novel method for the preparation of pentaerythritol polyglycols.

Polyglycols prepared by the oxyethylation of pentaerythritol are well known in the prior art and are described, for example, in U.S. Patent 1,922,459. They are normally prepared by reacting pentaerythritol with ethylene oxide in the presence of a catalyst. The molecular weight and thus the properties of the resultant compounds can be controlled and predetermined by the amount of ethylene oxide utilized in the condensation reaction. Although the industrial potentialities of the pentaerythritol polyglycols are well recognized, these compounds have not been used extensively in commerce because of their relatively high cost resulting from difficulty of preparation. In accordance with prior practices, pentaerythritol was oxyethylated at an elevated temperature and under pressure. While these procedures are generally satisfactory, they are dependent upon relatively costly equipment and careful control and are relatively inflexible. Attempts have also been made to prepare such condensation products by the direct oxyethylation of pentaerythritol at atmospheric pressure. Such methods have proved unsuccessful because pentaerythritol undergoes extensive dehydration and decomposition at its melting point of approximateley 258° C.

Therefore, it is an object of the present invention to provide a novel process for the preparation of pentaerythritol polyglycols by the condensation of ethylene oxide with pentaerythritol. It is a further object of this invention to provide a novel and improved process for the oxyethylation of pentaerythritol.

These and other objects are accomplished in accordance with this invention, generally speaking, by reacting ethylene oxide with a glycol. More specifically, this invention contemplates introducing ethylene oxide into a solution of pentaerythritol in dimethyl ether of diethylene glycol at its boiling point under atmospheric pressure. The reaction is preferably carried out in the presence of a small amount of any of the conventional oxyethylation catalysts such as, for example, the carbonates and hydroxides of potassium and sodium, and the like. Dimethyl ether of diethylene glycol is particularly well suited as the vehicle for carrying out the reaction since it is an excellent non-reactive solvent for pentaerythritol, ethylene oxide, and the resultant polyglycols. In addition, this solvent is unique in that the optimum oxyethylation temperature of petaerythritol coincides with the boiling point of solutions of pentaerythritol in dimethyl ether of diethylene glycol at about 165° C.

In carrying out the process of the present invention, the pentaerythritol is mixed with the dimethyl ether of diethylene glycol and a catalyst at room temperature and the mixture heated to its boiling point of approximately 165° C. under atmospheric pressure. As the mixture is heated, the pentaerythritol is dissolved to form a clear solution. The reaction mixture is purged with an inert gas, such as nitrogen, during the heating period and also throughout the reaction. This serves to remove any oxygen and water from the solvent and also avoids any possibility of an explosive atmosphere of ethylene oxide and air. In order to provide adequate control of the reaction conditions, the solvent vapors evolving from the reaction mixture are preferably condensed and returned to the mix by any conventional refluxing means.

Gaseous ethylene oxide is introduced into the solution by adding it at a point below the liquid level. The rate of addition is not critical but it is preferred that it be added at a sufficiently slow and uniform rate to insure that substantially all of the ethylene oxide will be condensed with the pentaerythritol. The reaction time for the condensation is quite rapid and for all practical purposes can be considered to be substantially instantaneous. Thus, after the requisite amount of ethylene oxide is added to the mixture, the solvent can be immediately distilled off and the product recovered. Normally no agitation in addition to that provided by the boiling solution, the purging gas, and the ethylene oxide is required, but auxiliary agitation can be readily provided if so desired.

The weight ratio of pentaerythritol to dimethyl ether of diethylene glycol can vary widely, it being only necessary that all of the pentaerythritol be dissolved in the dimethyl ether of diethylene glycol at the solution's boiling point of about 165° C. Thus, up to one part of pentaerythritol can be utilized for each part of dimethyl ether of diethylene glycol used as a solvent. In the interest of economy and ease of solvent recovery, relatively concentrated solutions are preferable. Thus, in most instances, it is preferred to employ solutions containing between about 60% and 70% pentaerythritol based on the weight of the solvent. The reaction can also be carried out in relatively dilute solutions and the value to which the weight ratio of pentaerythritol to dimethyl ether of diethylene glycol can be reduced is dictated only by economic considerations.

As indicated above, the solvent is generally removed by distillation after the ethylene oxide has been added. When liquid adducts containing different proportions of ethylene oxide are to be prepared at the same installation, a large quantity of a liquid adduct containing 4 or 5 mols of ethylene oxide can be made and after removal of the solvent, this base material used for the preparation of higher ethoxylated liquid products. In accordance with this modification of the invention, the liquid adduct containing from about 4 to 5 mols of ethylene oxide for each mol of pentaerythritol is heated to about 165° C., purged with an inert gas, and reacted with additional ethylene oxide in accordance with the procedure described above.

In order further to describe and clarify the invention, the following is a detailed description of a preferred embodiment thereof. All proportions in the embodiment and throughout the application are given in parts by weight unless otherwise indicated.

About 136 parts of pentaerythritol were mixed with approximately 200 parts of the dimethyl ether of diethylene glycol at room temperature, about ¼ of the pentaerythritol remaining undissolved until the mixture was heated. The temperature of this reaction mixture was then elevated to its boiling point of approximately 165° C. while purging with nitrogen. After all of the pentaerythritol had dissolved to provide a clear solution, ethylene oxide was introduced below the level of the liquid at an overall rate of about 1⅓ parts per minute until a total of approximately 640 parts of ethylene oxide had been added. This represented about 14.5 mols of ethylene oxide for each mol of pentaerythritol. After the ethylene oxide had been added, the solvent was removed by distillation. The product resulting was obtained in substantially quantitative amounts and was a brown-colored, clear liquid. This compound, containing approximately 14.5 mols of ethylene oxide per mol of pentaerythritol had a freezing point of approximately −35° C., a density of 1.142, and exhibited a viscosity of 350 centipoises at 30° C.

The pentaerythritol polyglycols as prepared in accordance with this invention can be advantageously utilized in a number of commercial and industrial applications, such as softening agents for cellophane and the like, camphor substitutes, cross-linking agents, solvents or plasticizers in the polymer field, surfactants, and lubricants in brake and other hydraulic fluid formulations.

While one complete embodiment has been disclosed in detail and modifications therein suggested, it is to be understood that the example given is for the purpose of illustrating the invention and not by way of limitation. It is recognized that those skilled in the art will make appropriate adjustment of the several variables in the process in order to adapt it to the peculiarities of any given operation and, consequently, it is to be distinctly understood that the invention is not limited to the example given save as indicated in the appended claims.

What is claimed is:

1. A process for the preparation of pentaerythritol polyglycols which comprises introducing ethylene oxide into a solution of pentaerythritol in dimethyl ether of diethylene glycol, the solution containing an oxyethylation catalyst and said solution being maintained substantially at its boiling point, and subsequently distilling to remove the dimethyl ether of diethylene glycol.

2. A process for the preparation of pentaerythritol polyglycols which comprises preparing a solution of pentaerythritol in the dimethyl ether of diethylene glycol containing a catalyst, heating the solution to its boiling point under atmospheric pressure while purging with an inert gas, maintaining the solution substantially at its boiling point, introducing ethylene oxide into the solution while continuing the nitrogen purge, and subsequently removing the dimethyl ether of diethylene glycol by distillation.

3. A process for the preparation of pentaerythritol polyglycols containing more than 5 mols of ethylene oxide per mol of pentaerythritol which comprises introducing between about 4 and 5 mols of ethylene oxide per mol of pentaerythritol into a boiling solution of pentaerythritol in dimethyl ether of diethylene glycol at atmospheric pressure, distilling the dimethyl ether of diethylene glycol from the reaction mixture, heating the pentaerythritol polyglycol containing between about 4 and 5 mols of ethylene oxide per mol of pentaerythritol and maintaining it at a temperature of approximately 165° C. while introducing ethylene oxide into the pentaerythritol polyglycol.

References Cited in the file of this patent
UNITED STATES PATENTS 2,766,292     Monson et al. _____ Oct. 9, 1956
2,902,478     Anderson _____ Sept. 1, 1959